Nov. 15, 1960     O. F. KUHLMAN     2,960,457
APPARATUS FOR VAPORIZING COATING MATERIALS
Filed Feb. 28, 1956
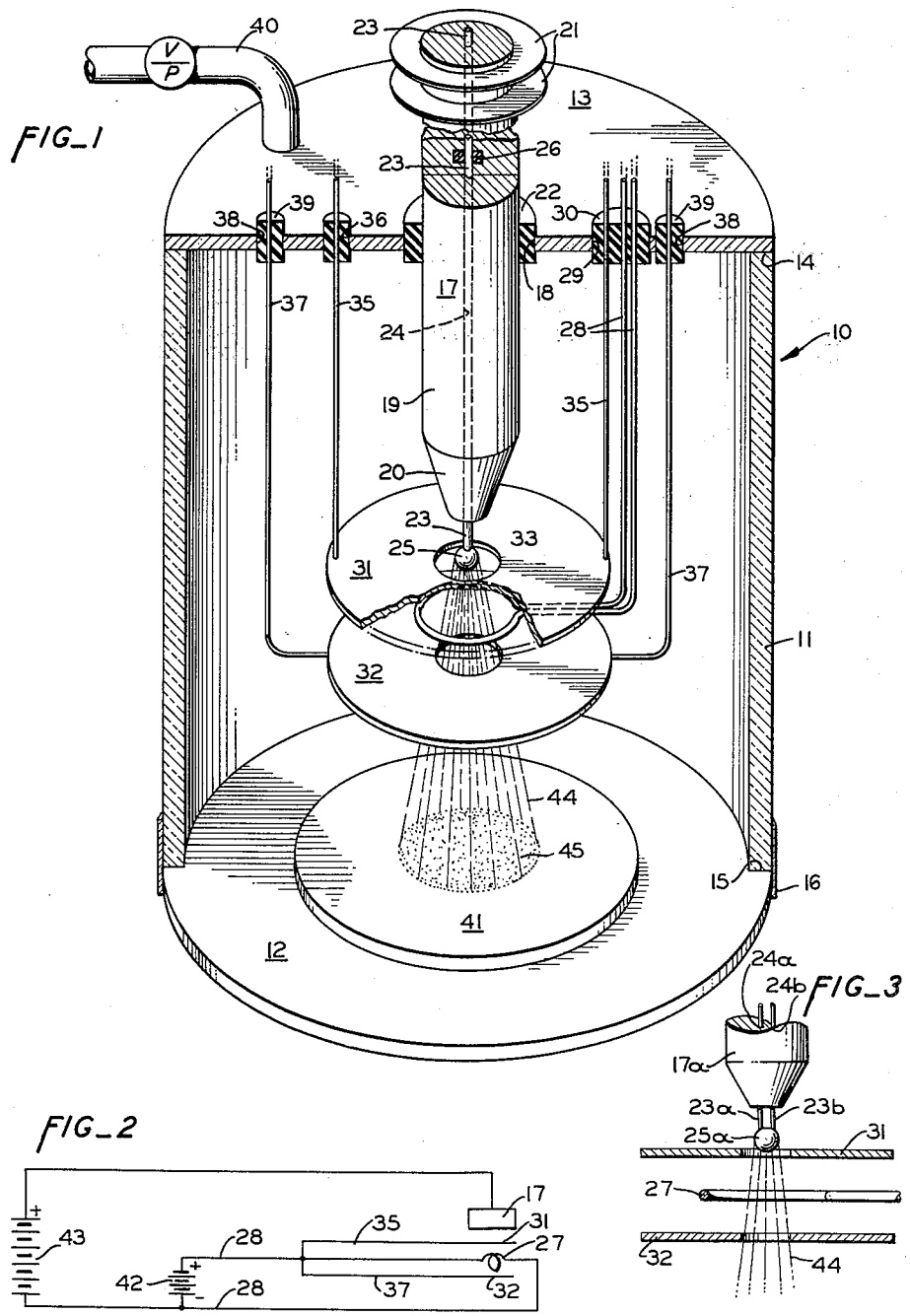
INVENTOR.
ORA F. KUHLMAN
BY Townsend, Townsend
and Hoppe
ATTORNEYS United States Patent Office 2,960,457
Patented Nov. 15, 1960

2,960,457

APPARATUS FOR VAPORIZING COATING MATERIALS

Ora F. Kuhlman, Manhattan Beach, Calif., assignor to Servomechanisms, Inc., Hawthorne, Calif., a corporation of New York Filed Feb. 28, 1956, Ser. No. 568,345

3 Claims. (Cl. 204—298)

This invention relates to a new and improved method of vaporizing coating materials in a vacuum and to improved apparatus for practicing the method.

Heretofore, the usual procedures for heating high melting point materials such as molybdenum, tantalum, tungsten, platinum and the like was to place such metals in a crucible or on a platform and heat the materials up to the temperature of evaporization. In the past this has been done in a vacuum and the heating has been effected both by emission and by radiant heat.

The prior art methods have critical defects making difficult their practical application commercially. These defects arise, in part, from the fact that the present art requires a crucible or support foreign to the material to be vaporized. Such crucibles or supports are affected by the high temperatures used in vaporizing the materials in two separate ways. In the first place the heat frequently destroys the crucibles or supports requiring replacement and the attendant expense of replacement. In the second place, and more importantly, portions of the crucibles or supports themselves tend to vaporize thereby contaminating the vaporized materials.

It is an object of this invention to dispense with the prior art crucibles, supports and the like by providing means for supporting the molten material virtually upon itself in a vaporizing zone while it is being vaporized thereby eliminating foreign contaminants.

It is a further object of this invention to provide a method for supplying additional material to be vaporized to a zone of vaporization so that vaporization can be practiced continuously.

The foregoing and further objects of this invention will become apparent upon an understanding of the following written specification when read in conjunction with the accompanying drawings and the appended claims.

The accompanying drawings disclose a selected embodiment of an apparatus illustrating the best mode presently contemplated by the inventor for carrying out the invention.

In the drawings:

Fig. 1 is a perspective view looking downwardly at the apparatus from an upper front elevation showing some of the parts broken away for greater clarity of understanding;

Fig. 2 is a wiring diagram illustrating the electrical circuit with which the apparatus of Fig. 1 is used; and Fig. 3 is a view showing an alternative embodiment of some of the elements of the invention.

The apparatus illustrated in Fig. 1 comprises an evacuated vessel 10 which is provided with a cylindrical glass wall 11, a circular bottom wall formed of a plate 12 and a circular top wall formed of a plate 13. Plate 13 is secured to the cylindrical wall 11 at a vacuum tight joint 14; whereas plate 12 is removably fastened to the cylindrical wall 10 at joint 15, where there is provided a vacuum seal 16.

An anode member 17 extends downwardly into the interior of the vessel 10 through an aperture 18 pierced in the top plate 13. This anode member 17 is made of an efficient heat and electron conducting metal, such as copper, and is formed in the shape of a rod having a generally cylindrical surface 19 which terminates at its lower portion in an inverted truncated conical section 20. The upper end of the anode member 17 is provided with a plurality of cooling fins 21 for dissipating heat. A vacuum and insulating seal 22 is provided in the aperture 18 for securing the anode 17 in non-conductive relation to the plate 13 and for preventing the ingress of atmosphere through said aperture.

Means are provided for feeding a material to be vaporized into the evacuated vessel. In the illustrative embodiment of Fig. 1, the material is formed in the shape of a wire or rod 23. The anode member 17 is provided with a cylindrical bore 24 extending longitudinally through the center of the anode member 17 thus forming a passage for feeding the wire into the interior of the vessel. The lower end of the wire 23 is heated to the melting point and forms into a ball 25 as is described later herein. A vacuum seal 26 is provided between the wire 23 and bore 24. The wire 23 is fed into the evacuated vessel 10 through the bore 24 either manually or by mechanical means, not illustrated, which will become readily apparent to those skilled in the art upon an understanding of this specification.

A filament 27 is arranged below the lower end of the anode member 17 and is shaped in the form of a nearly complete circle being arranged so that all of the points on the circumference of said circle are in a plane parallel to the plane defined by the truncated portion of the section 20 of the anode 17 and also are equidistant from the lower edge of the anode member 17. The filament 27 is supported upon filament leads 28 which extend outwardly through an aperture 29 in the top plate 13 of the vessel. This aperture 29 is sealed by means of an insulating vacuum seal 30 which also furnishes mechanical support for the filament leads 28.

Two circular discs 31 and 32 are arranged above and below the filament 27 respectively and are provided with central apertures 33 and 34 respectively. The discs are arranged coaxially with respect to the axis of the anode 17 and the planes of the discs are arranged in parallelism with the lower face of the anode 17 and with the plane of the filament 27. Both apertures are smaller than the diameter of the filament 27.

The disc 31 is suported by leads 35, one lead extending through the aperture 29 in the plate 13 and the other lead extending through an aperture 36 in the plate 13. Disc 32 is supported by leads 37 extending through apertures 38 in the plate 13. Insulating vacuum seals 39 are provided in the apertures 36 and 38 and these also form mechanical supports for the leads 35 and 37.

Further, the top plate 13 is provided with a duct 40 which is connected to a vacuum pump for evacuating the interior of the chamber 10.

The article 41 to be coated with the material comprising wire 23 is placed below the anode 17 and, in the illustrative embodiment, is formed with a flat surface arranged in parallelism with the lower end of anode 17, the filament 27 and the discs 31 and 32 and with its center on the axis of the anode 17.

The various elements described above are connected to sources of electricity in a manner illustrated diagrammatically in Fig. 2. Filament leads 28 are connected to a filament supply 42, and one of the leads 28 to the filament and a lead to the anode 17 are connected to an anode 17 are connected to an anode supply 43. In the illustrative embodiment the leads 35 and 37 supporting the apertured discs 31 and 32 are connected to the positive terminal of the filament supply.

The method of operating the foregoing apparatus and of producing a film upon an article is readily perceived upon an understanding of the operation of the apparatus.

In this explanation of the operation of the apparatus, tantalum is selected as the material to be vaporized and to be coated upon the article 41. For purposes of illustration, a wire or rod 23 of tantalum having a diameter of .05 inch is fed into the bore 24 of the anode 17 until the lower end of the wire is in approximate alignment with the plane of the filament 27. The filament 27 is now supplied with power in the order of 700 watts and the anode is supplied with power in the order of about 200 watts. In a selected embodiment of the invention a filament voltage of 3.5 volts and 200 amperes and an anode power of 2000 volts and 100 milliamperes was found to supply the proper power to produce an effective result.

After equilibrium is reached, the lower end of the wire 23 which has been bombarded with electrons from the filament 27 will become molten. In the selected embodiment this wire is formed into a ball 25 having a diameter of approximately 5/32 inch. Continued heating causes the surface of the ball 25 to evaporate forming a shower 44 of vaporized material. This shower 44 impinges upon the upper surface of the article 41 and condenses, thereby forming a metal film 45.

In the foregoing operation, the cooling fins 21 and the aperture plates 31 and 32 play important roles.

The cooling fins 21 maintain the temperature of the anode member 17 below the temperature of its vaporization and thereby prevent contaminants from the anode member settling upon the article 41. In addition, the conduction from the wire 23 through the anode member 17 dissipates heat from the wire 23 and thus, by controlling the effectiveness of the cooling fins, one can control the size and position of the molten ball 25.

The aperture plate 31 defines the upper limit of the zone of vaporization and aids in regulating the position of the molten ball. As the ball 25 melts and evaporates it tends to climb up the wire 23. As soon as the molten ball 25 reaches a position above the aperture plate 31, the influence of the aperture plate effectively reduces the number of electrons striking the ball 25 from the filament 27 thereby reducing the heat and resultant evaporation. In this manner, the plate provides an upper limit to the zone of vaporization. As a result, as soon as the ball reaches this position, evaporation from the ball is prevented until the rod 23 is fed downwardly bringing the ball 25 back into the vaporization zone. This prevents destruction to the apparatus and overheating of the anode in the event that the rod is not fed in response to the degree of evaporation. In this specification, therefore, the zone of vaporization means that zone in proximity with the filament and below the zone of influence of said apertured disc 31.

The disc 32 tends to reduce or eliminate any extraneous evaporation which might otherwise reach the target 41 from the filament 27.

In the operation of the foregoing apparatus it has been determined that certain modifications may be made with comparable, and sometimes improved, results. By way of example and not by way of limitation we point out several modifications.

One of the most important and most effective modifications is that illustrated in Fig. 3. In this modification two wires 23ᵃ and 23ᵇ are arranged in parallel bores 24ᵃ and 24ᵇ in anode 17ᵃ. The other elements remain unchanged. In this embodiment the ball 25ᵃ forms on both wires 23ᵃ and 23ᵇ, the two wires providing several points of contact for the molten ball. The molecular attraction for the several points of contact between the molten ball and the rods prevents the molten mass from dropping off due to vibration and lack of contact area for a given fluidity.

Moreover, it will be appreciated that this method of evaporation may be used upon many metals having melting characteristics similar to those of tantalum described above. Other materials evaporated to date by this method with complete satisfaction include molybdenum, tungsten, platinum and a nickel-chromium-aluminum-copper alloy known under the trade name of "Evanohm" which is commercially available from the Wilbur B. Driver Co.

Furthermore, although in the illustrative embodiment the aperture plates 31 and 32 are shown at a zero potential with respect to the positive terminal of the filament it has been observed that satisfactory results are obtainable by making the aperture plates slightly negative with respect to the filament.

Other modifications within the teaching of the foregoing specification will become apparent to those skilled in the art upon an understanding of the foregoing specification; the limitations upon the scope of the invention being defined in the appended claims.

I claim:

1. Apparatus for coating materials in a vacuum comprising a vacuum chamber; a cathode within said vacuum chamber; an anode member within said vacuum chamber embracing and electrically connected to an extendable rod of vaporizable material; a source of electric potential applied across said anode member and said cathode inducing a current of electrons to flow from said cathode to said anode; means positioned between said anode member and said cathode for shielding said anode member other than said extendable rod from bombardment by said current of electrons; means for continuously feeding said extendable rod from said anode member into said current of electrons to heat by electronic bombardment only said extendable rod to its temperature of vaporization.

2. Apparatus for coating materials in a vacuum comprising a vacuum chamber; a cathode within said vacuum chamber; an anode member within said vacuum chamber embracing and electrically connected to an extendable rod of vaporizable material; a source of electric potential applied across said anode member and said cathode inducing a current of electrons to flow from said cathode to said anode; means positioned between said anode member and said cathode for shielding said anode member other than said extendable rod from bombardment by said current of electrons; means for continuously feeding said extendable rod from said anode member into said current of electrons to heat by electronic bombardment only said extendable rod to its temperature of vaporization; means for supporting an article to be coated within the range of material vaporized from said extendable rod; and means for defining the pattern in which said vaporized material is deposited on said article.

3. Apparatus for coating materials in a vacuum comprising a vacuum chamber; a cathode within said vacuum chamber; an anode member within said vacuum chamber embracing and electrically connected to an extendable rod of vaporizable material; means for continuously feeding said extendable rod from said anode member into a delineated electric field for bombardment by electrons produced by said cathode to heat only said extendable rod to its temperature of vaporization; means positioned between said anode member and said cathode for shielding said anode member other than said extendable rod from direct bombardment by electrons produced by said cathode; means for supporting an article to be coated within the range of material vaporized from said extendable rod by said electronic bombardment; and means for shielding said article from extraneous vaporized cathode material.

References Cited in the file of this patent

UNITED STATES PATENTS

| | | |
|---|---|---|
| 2,153,786 | Alexander et al. | Apr. 11, 1939 |
| 2,527,747 | Lewis et al. | Oct. 31, 1950 |
| 2,665,227 | Clough et al. | Jan. 5, 1954 |
| 2,746,420 | Steigerwald | May 22, 1956 |
| 2,754,259 | Robinson et al. | July 10, 1956 |
| 2,771,568 | Steigerwald | Nov. 20, 1956 |